US012240299B2

(12) United States Patent
Aoyama

(10) Patent No.: US 12,240,299 B2
(45) Date of Patent: Mar. 4, 2025

(54) VEHICLE DOOR STRUCTURE

(71) Applicant: SUBARU CORPORATION, Tokyo (JP)

(72) Inventor: Tomonori Aoyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/505,564

(22) Filed: Nov. 9, 2023

(65) Prior Publication Data

US 2024/0190226 A1 Jun. 13, 2024

(51) Int. Cl.
*B60J 10/84* (2016.01)
*B60J 10/86* (2016.01)

(52) U.S. Cl.
CPC .............. *B60J 10/85* (2016.02); *B60J 10/86* (2016.02)

(58) Field of Classification Search
CPC ............ B60J 10/85; B60J 10/86; B60J 10/75
USPC ........................ 49/498.1, 490.1, 495.1, 489.1
See application file for complete search history.

(56) References Cited

U.S. PATENT DOCUMENTS

| | | | |
|---|---|---|---|
| 6,227,634 B1 * | 5/2001 | Cittadini | F25D 23/087 49/478.1 |
| 8,490,333 B2 * | 7/2013 | Gholap | F25D 23/087 49/478.1 |
| 8,991,102 B2 * | 3/2015 | Minagawa | B60J 10/86 49/489.1 |
| 10,626,665 B2 * | 4/2020 | Amagai | E06B 7/2309 |
| 10,752,101 B2 * | 8/2020 | Kamitani | B60J 10/15 |
| 2004/0051427 A1 * | 3/2004 | Cittadini | F25D 23/082 312/405 |
| 2004/0139661 A1 * | 7/2004 | Cittadini | F25D 23/082 49/478.1 |
| 2005/0076575 A1 * | 4/2005 | Cittadini | F25D 23/087 49/498.1 |
| 2006/0137255 A1 * | 6/2006 | Nozaki | B60J 10/50 49/489.1 |
| 2009/0058246 A1 * | 3/2009 | Cittadini | F25D 23/087 49/477.1 |
| 2019/0047391 A1 * | 2/2019 | Kamitani | B60J 10/24 |
| 2024/0100926 A1 * | 3/2024 | Mochida | B60J 10/86 |
| 2024/0190226 A1 * | 6/2024 | Aoyama | B60J 10/75 |

FOREIGN PATENT DOCUMENTS

JP 6928900 B2 9/2021

* cited by examiner

*Primary Examiner* — Jerry E Redman
(74) *Attorney, Agent, or Firm* — MCGINN I.P. LAW GROUP, PLLC

(57) ABSTRACT

A vehicle door structure includes a weather strip part including hard member and soft members that are integrally molded, and includes: a base; a first seal portion in close contact with a protrusion in a fitting portion from a vehicle upper side; a second seal portion in close contact with the fitting portion's vehicle upper side surface; a third seal portion in close contact with a vehicle body; and a fixing portion sandwiching and fixing the protrusion between the first seal portion and the fixing portion. The hard member is continuously provided to pass the second seal portion's vehicle upper side from the base's inner end in the vehicle width direction, have a bent portion towards upward from the vehicle upper side, and further pass the first seal portion and an inside of the fixing portion in the vehicle width direction up to the third seal portion's vehicle upper end.

2 Claims, 5 Drawing Sheets

VEHICLE DOOR STRUCTURE

CROSS-REFERENCE TO RELATED APPLICATIONS

The present application claims priority from Japanese Patent Application No. 2022-197086 filed on Dec. 9, 2022, the entire contents of which are hereby incorporated by reference.

BACKGROUND

The disclosure relates to a vehicle door structure.

In general, a weather strip or the like is attached between a sash of a vehicle door and a vehicle body in order to prevent entry of rainwater or the like from the outside when the vehicle door is closed. Then, the weather strip is in close contact with the space between the sash and the vehicle body to prevent rainwater or the like from entering from the outside.

In addition, in a sash roof portion formed on an upper portion of the vehicle door, it is desirable to prevent rainwater or the like flowing from the upper portion side of the vehicle through a roof portion of the vehicle body and rainwater or the like flowing from the upper portion side of the vehicle through the vehicle door portion.

On the other hand, in order to assemble the weather strip to the vehicle door, pin assembly in which a pin is incorporated into the weather strip and the pin is pushed into a door side panel, slide assembly in which a guide groove is provided in the door side panel and the weather strip is slid and inserted into the guide groove, fitting assembly in which a fitting portion is provided in the door side panel and a pressing force is applied to the weather strip to fit the fitting portion, and the like can be exemplified.

For example, Japanese Patent No. 6928900 discloses a technique in which a lip portion protruding toward an upper side of the vehicle is formed, a solid material is used for the attachment base, a sponge material is used for a hollow seal portion, and the internal pressure of the hollow seal portion is reduced by changing the internal capacity of the hollow seal portion when the door is closed. Further, a pin is incorporated into the weather strip, and the weather strip is assembled to the vehicle door by pushing the pin into the door side panel (see, for example, Japanese Patent No. 6928900).

SUMMARY

An aspect of the disclosure provides a vehicle door structure for a vehicle. The vehicle door structure includes a weather strip part extending to surround a periphery of a vehicle door of the vehicle on an inside in a vehicle width direction of the vehicle and seal between the vehicle door and a vehicle body of the vehicle. The weather strip part includes a hard member and a soft member integrally molded with the hard member. The weather strip part includes a base, a first seal portion, a second seal portion, a third seal portion, and a fixing portion. The base is fitted to both sides of a fitting portion in a vehicle width direction. The fitting portion is provided in the vehicle door. The first seal portion is in close contact with a protrusion provided in the fitting portion from a vehicle upper side. The second seal portion is provided to protrude toward a vehicle lower side of the base, and is in close contact with a vehicle upper side surface of the fitting portion from the vehicle upper side. The third seal portion is provided such that the third seal portion protrudes toward the vehicle upper side, and is in close contact with the vehicle body from the vehicle lower side when the vehicle door is closed. The fixing portion is provided between the first seal portion and the second seal portion to protrude outward in the vehicle width direction, is in close contact with the protrusion from the vehicle lower side, and sandwiches and fixes the protrusion between the first seal portion and the fixing portion. The hard member is continuously provided such that the hard member passes a vehicle upper side of the second seal portion from an inner end in the vehicle width direction at the base, has a bent portion facing a vehicle upper side from the vehicle upper side of the second seal portion, and further passes the first seal portion and the inside in the vehicle width direction of the fixing portion up to a vehicle upper end of the third seal portion.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIGS. 5A, 5B, and 5C are cross-sectional views of deformation of the weather strip when assembling work in the vehicle door according to the embodiment of the disclosure is performed, taken along line A-A illustrated in FIG. 1 as viewed from direction A, in which FIGS. 5A, 5B, and 5C are cross-sectional views illustrating deformation of the weather strip in time series during the assembling work.

DETAILED DESCRIPTION

Figure 1:
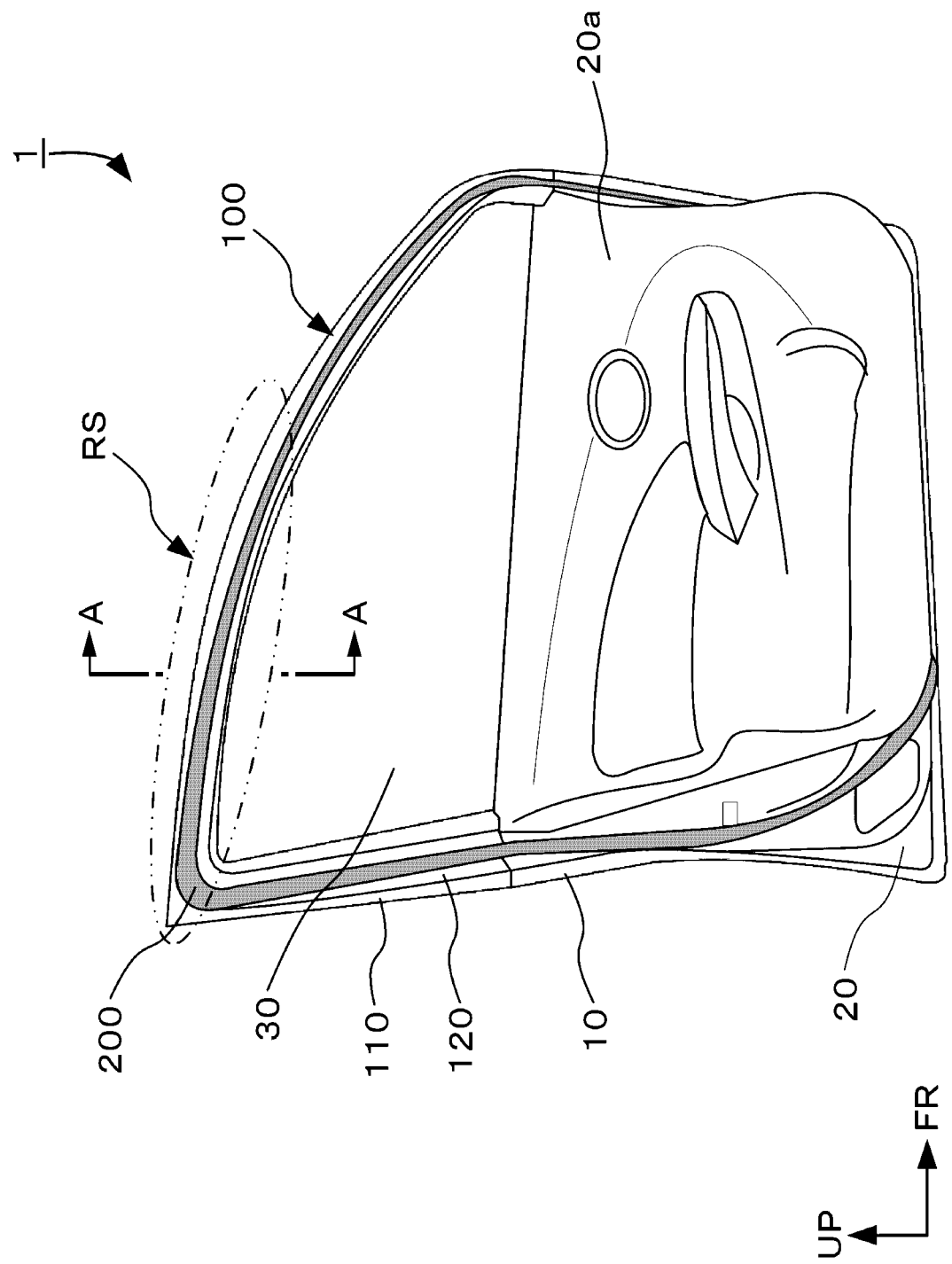
FIG. 1 is a schematic configuration view of a vehicle door according to an embodiment of the disclosure as viewed from an inside in a vehicle width direction.

In the technique described in Japanese Patent No. 6928900, rainwater or the like from the roof portion of the vehicle body is prevented from entering by bringing the lip portion and the hollow seal portion into close contact with the roof portion of the vehicle body by a pressing force when the vehicle door is closed. However, rainwater or the like from the vehicle door portion is prevented from entering by bringing the lip portion into close contact with the vehicle door portion by a pressing force due to internal pressure generated in the hollow seal portion and a pressing force due to pin assembly when the vehicle door is closed. Accordingly, in a case where the internal pressure of the hollow seal portion decreases when the vehicle door is closed, and at a position where the pin is not provided, there is a problem that an adhesion force of the weather strip to the vehicle door portion is insufficient, and water may leak from a gap generated between the weather strip and the vehicle door portion.

In general, in a case of the slide assembly, there is a possibility that water leakage occurs from a gap generated in the door side panel due to variation in adhesion force occurring between the guide groove and the weather strip.

Further, in a case of the fitting assembly, there is a possibility that water leakage occurs due to an insertion failure in fitting and assembling work.

Therefore, the disclosure has been made in view of the above-described problems, and provides a vehicle door structure that maintains favorable assembly workability and prevents entry of rainwater or the like from the outside.

Hereinafter, a vehicle door 1 according to the present embodiment will be described with reference to FIGS. 1 to 5C. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. Note that an arrow FR appropriately illustrated in the drawings indicates the forward (front) of the vehicle V to which the vehicle door 1 is attached, an arrow UP indicates the upper side in front view, and an arrow LH indicates the left side in front view. Further, in the following description, up-down, front-rear, and left-right directions indicate an up-down direction of the vehicle V in front view, a front-rear direction in front view, and a left-right direction in front view unless otherwise specified.

Embodiment

A configuration of the vehicle door 1 will be described with reference to FIGS. 1 to 4. Note that the vehicle door 1 mounted on the right side in front view of the vehicle V will be described as an example.

<Configuration of Vehicle Door 1>

As illustrated in FIG. 1, the vehicle door 1 includes an outer panel 10, an inner panel 20, a door window unit 30, a door sash part 100, and a weather strip part 200.

(Outer Panel 10 and Inner Panel 20)

The outer panel 10 is a plate-like member constituting an outer plate of the vehicle door 1. Further, the inner panel 20 is a plate-like member constituting an inner plate of the vehicle door 1, and is disposed inside the outer panel 10 in a vehicle width direction. The outer panel 10 and the inner panel 20 are formed by pressing a metal plate or the like.

The outer panel 10 and the inner panel 20 are combined with each other, and are coupled by welding or the like at respective ends in the vehicle front-rear and up-down directions.

Further, in the vehicle door 1, an interior part 20*a* is provided on the inside in the vehicle width direction so as not to expose the inner panel 20.

(Door Window Unit 30)

The door window unit 30 is a plate-like tempered glass attached so as to be movable up and down in the vehicle door 1. In a state where the door window unit 30 is raised, a door sash part 100 described later is closed. In a side view of the vehicle V, a front end edge and a rear end edge of the door window unit 30 form a substantially trapezoid formed in accordance with the inclination of the door sash part 100.

(Door Sash Part 100)

The door sash part 100 is provided in a vehicle upper part of the vehicle door 1 so as to surround the door window unit 30. The door sash part 100 is coupled to the outer panel 10 and the inner panel 20 by welding or the like.

The door sash part 100 includes an outer door sash member 110 and an inner door sash member 120. The outer door sash member 110 and the inner door sash member 120 are, for example, members processed by roll molding or the like in which a long plate material such as a metal plate is bent in stages to have a predetermined cross-sectional shape. Then, the door sash part 100 is configured by fixing the outer door sash member 110 and the inner door sash member 120 by hemming or the like. On a vehicle upper side of the door sash part 100, a sash roof portion RS close to a roof portion of a vehicle body S is formed.

The outer door sash member 110 is provided outside the door sash part 100 in the vehicle width direction. A sash retainer 130 on the vehicle upper side of the door sash part 100 is provided with an inclination toward a vehicle lower side from a vehicle rear side toward the vehicle front side in accordance with the shape of the vehicle door 1.

Figure 2:
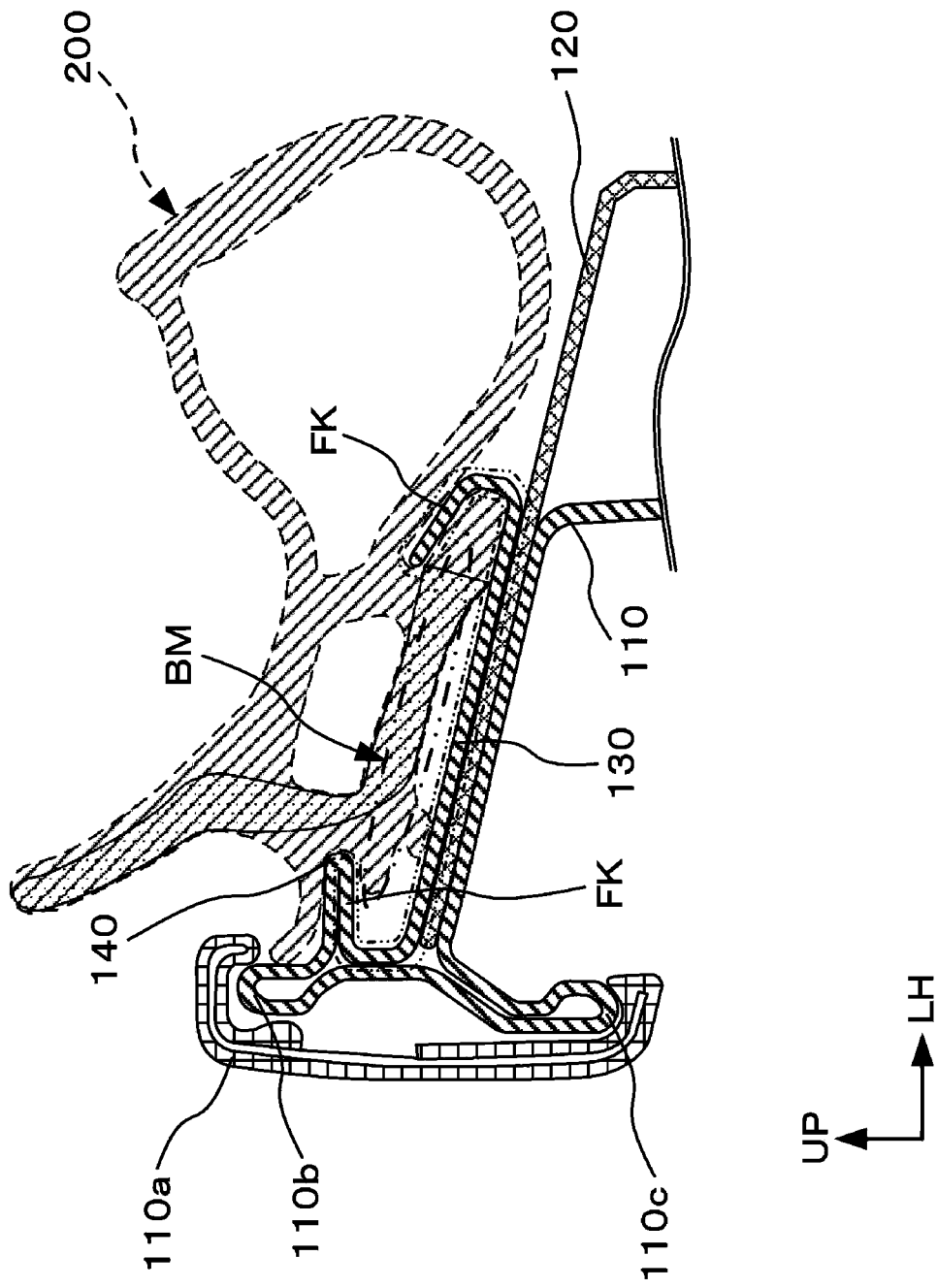
FIG. 2 is a cross-sectional view taken along line A-A illustrated in FIG. 1 as viewed from a vehicle rear side.

Further, as illustrated in FIG. 2, in the outer door sash member 110, the sash retainer 130 as a fitting portion for fixing the weather strip part 200 to the door sash part 100 is formed. The sash retainer 130 is provided inside the door sash part 100 in the vehicle width direction so as to cover an outer periphery of the door sash part 100. On both sides in the vehicle width direction of the sash retainer 130, folded portions FK for holding a base BM of the weather strip part 200 are provided.

Further, a retainer protrusion 140 as a protrusion is formed in the sash retainer 130. The retainer protrusion 140 protrudes inward in the vehicle width direction, and is formed by bending an outside portion of the sash retainer 130 in the vehicle width direction by roll molding or the like.

A pillar garnish 110*a* is provided on the outside in the vehicle width direction of the outer door sash member 110. The pillar garnish 110*a* is an exterior member formed of a steel plate or the like attached to the door sash part 100 from the outside in the vehicle width direction. The pillar garnish 110*a* is disposed so as to ensure the design of the door sash part 100 and not to expose constituent members of the door sash part 100 to the outside in the vehicle width direction. The pillar garnish 110*a* is fitted and fixed to outer protrusions 110*b* and 110*c* protruding in the vehicle up-down direction provided on the vehicle upper and lower portions, respectively, on the outside in the vehicle width direction of the outer door sash member 110.

The inner door sash member 120 is provided inside the door sash part 100 in the vehicle width direction. On the vehicle lower side of the sash retainer 130, the inner door sash member 120 is sandwiched between the outer door sash member 110 and fixed by hemming or the like.

(Weather Strip Part 200)

Figure 3:
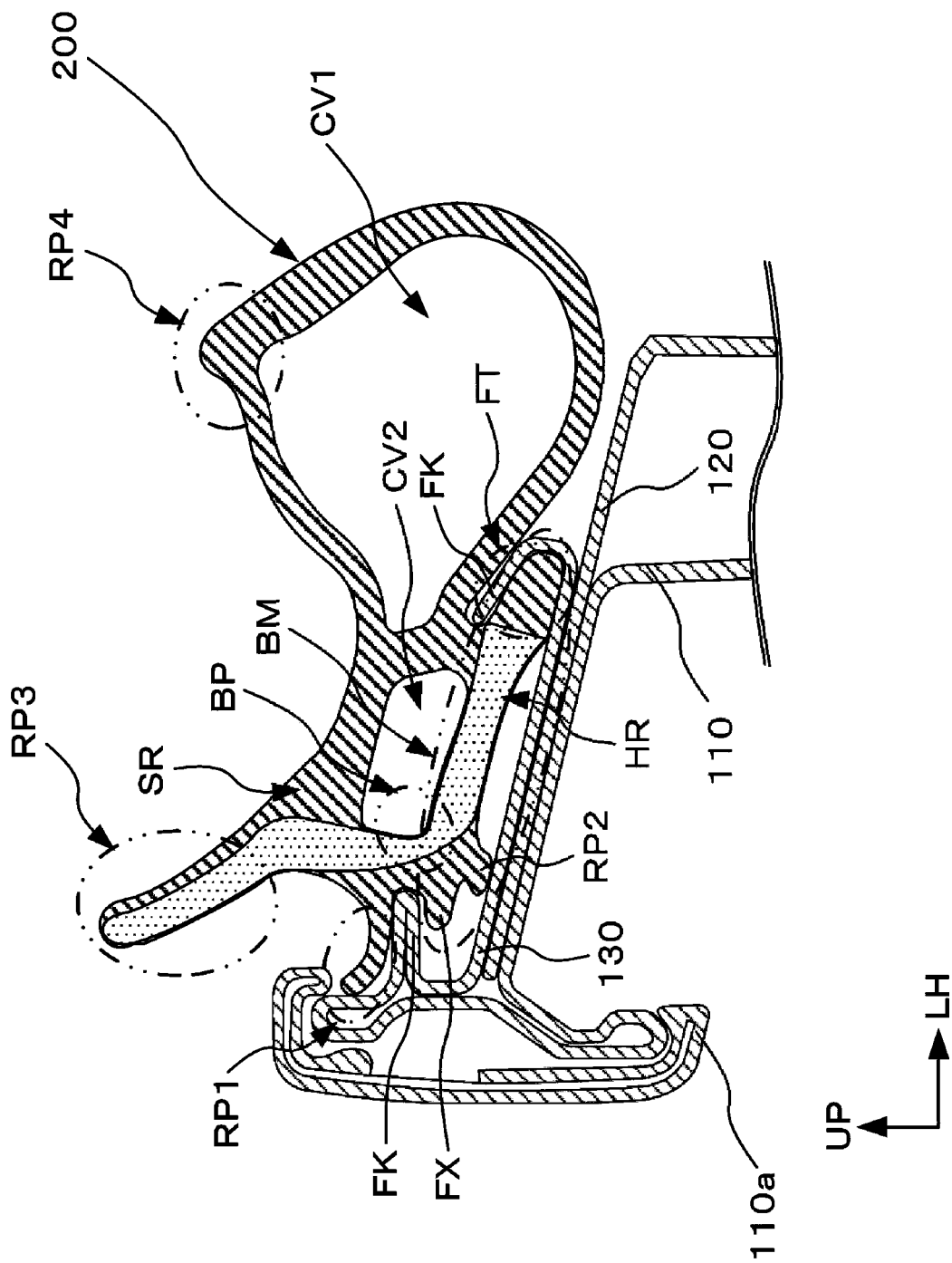
FIG. 3 is a cross-sectional view of a weather strip according to the embodiment of the disclosure taken along line A-A illustrated in FIG. 1 as viewed from direction A.

As illustrated in FIGS. 1 and 3, in the weather strip part 200, a hard member HR and a soft member SR are integrally molded to seal between the vehicle body S and the vehicle door 1. The weather strip part 200 is disposed from the inner panel 20 to the door sash part 100 so as to surround the inner periphery of the vehicle door 1 in the vehicle width direction.

The weather strip part 200 is molded from a soft resin, a rubber material, or the like, and is fitted and fixed to the sash retainer 130 as illustrated in FIG. 3. The weather strip part 200 is formed with the base BM, a lip portion RP1 as a first seal portion, a lip portion RP2 as a second seal portion, a lip portion RP3 as a third seal portion, a lip portion RP4, a fixing portion FX, and cavities CV1 and CV2.

The base BM is provided on the vehicle lower side of the weather strip part 200 and is fitted to the folded portion FK provided on the vehicle width direction inside of the sash retainer 130. A fitting lip portion FT as an inner end in the vehicle width direction protruding inward in the vehicle width direction is formed in the base BM. Further, the fixing portion FX to be described later is formed on the outside in the vehicle width direction. The weather strip part 200 is fixed to the sash retainer 130 by fitting the fitting lip portion FT and the fixing portion FX into the folded portions FK of the sash retainer 130.

The lip portion RP1 is formed to protrude outward in the vehicle width direction of the weather strip part 200. The lip portion RP1 is formed of the soft member SR, and is attached to the sash retainer 130 in close contact with a vehicle upper side of the retainer protrusion 140 and the inside of the outer protrusion 110b in the vehicle width direction.

The lip portion RP2 is formed on the vehicle lower side surface of the base BM to protrude toward the vehicle lower side of the weather strip part 200, and is in close contact with a vehicle upper side surface of the sash retainer 130 from the vehicle upper side. The lip portion RP2 is formed of the soft member SR and is in close contact with the vehicle lower side of the retainer protrusion 140.

The lip portion RP3 is formed so as to protrude with an inclination on the outside of the vehicle upper portion of the weather strip part 200, and when the vehicle door is closed, the lip portion RP3 brings the inner surface in the vehicle width direction into close contact from the vehicle lower side. The lip portion RP3 is formed on the outside in the vehicle width direction of the lip portion RP4. In the lip portion RP3, the hard member HR is disposed from a vehicle upper end of the lip portion RP3 to the vehicle lower side on the outside in the vehicle width direction, and the soft member SR is disposed on the inside in the vehicle width direction.

The lip portion RP4 is formed to protrude toward the vehicle upper side on the inside in the vehicle width direction of the weather strip part 200, and when the vehicle door is closed, the lip portion RP4 brings the inner surface in the vehicle width direction into close contact with the inner surface from the vehicle lower side. The cavity CV1 is formed in a vehicle lower portion of the lip portion RP4.

The fixing portion FX is formed between the lip portion RP1 and the lip portion RP2 so as to protrude outward in the vehicle width direction, is in close contact with the retainer protrusion 140 from the vehicle lower side, and fixes the lip portion RP1 by sandwiching the retainer protrusion 140 between the fixing portion FX and the lip portion RP1. The fixing portion FX is fitted to the folded portion FK on the outside in the vehicle width direction in the sash retainer 130.

The cavities CV1 and CV2 are formed inside the weather strip part 200. The cavity CV1 is formed in a vehicle lower portion of the lip portion RP4 on the inside in the vehicle width direction, and a periphery of the cavity CV1 is formed by the soft member SR.

The cavity CV2 is formed in a substantially rectangular shape on the vehicle upper side of the base BM in a cross-sectional view from the vehicle rear side. The hard member HR is disposed on the vehicle lower side and on the outside in the vehicle width direction of the cavity CV2, and the soft member SR is disposed on the vehicle upper side and on the inside in the vehicle width direction of the cavity CV2.

Elastic members such as soft resin or rubber material are used as the hard member HR and the soft member SR used as the members of the weather strip part 200.

The hard member HR is, for example, a member having high hardness with less foaming treatment. Further, the soft member SR is, for example, a member having more flexibility than the hard member HR by performing the foaming treatment more than that for the hard member HR.

The hard member HR is continuously provided to pass the vehicle upper side of the lip portion RP2 from the inner end in the vehicle width direction at the base BM, have a bent portion BP facing a vehicle upper side from the vehicle upper side of the lip portion RP2, and further pass the lip portion RP1 and the inside in the vehicle width direction of the fixing portion FX up to the vehicle upper end of the lip portion RP3. The bent portion BP is provided on the inside in the vehicle width direction of the fixing portion FX on the lower outside in the vehicle width direction of the cavity CV2, and is bent from the outside in the vehicle width direction toward the vehicle upper side.

Further, the hard member HR is formed in a substantially linear shape from the lip portion RP1 to the bent portion BP, and is formed in a substantially linear shape from the bent portion BP to the fitting lip portion FT in the base BM.

<Action and Effect>

An operation of the weather strip part 200 in the vehicle door 1 according to the present embodiment configured as described above will be described with reference to FIGS. 4 and 5.

(Regarding Waterproofing)

Figure 4:
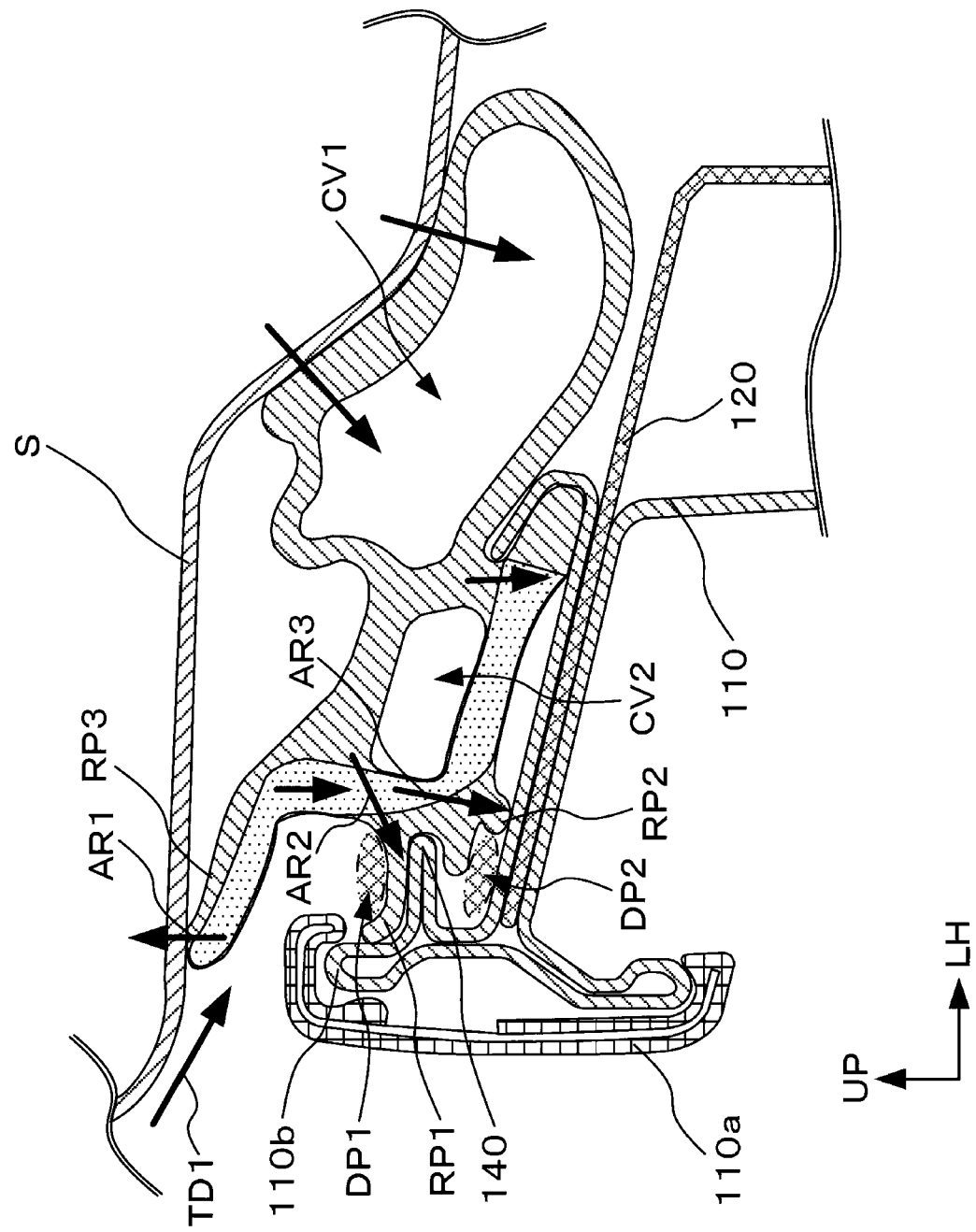
FIG. 4 is a cross-sectional view taken along line A-A illustrated in FIG. 2 when the vehicle door is opened as viewed from direction A.

In a state where the vehicle door 1 is closed, rainwater or the like from the outside enters from between the vehicle body S and the pillar garnish 110a as indicated by an arrow TD1 in FIG. 4.

The lip portion RP3 is in close contact with the vehicle body S from the lower side of the vehicle. On the lip portion RP3, since the hard member HR is disposed up to the vehicle upper end portion of the lip portion RP3, a pressing force is applied in a direction indicated by an arrow AR1 and causes the lip portion RP3 to be strongly in close contact with the vehicle body S. Thus, rainwater or the like entering from between the vehicle body S and the pillar garnish 110a is repelled by the lip portion RP3.

The rainwater or the like repelled by the lip portion RP3 flows down to the vehicle upper side of the lip portion RP1. A pressing force is applied to the lip portion RP1 in a direction indicated by an arrow AR2 by the cavities CV1 and CV2 being pressed outward in the vehicle width direction against the vehicle body S. Further, since the hard member HR is disposed in the vehicle up-down direction inside the lip portion RP1 in the vehicle width direction, the lip portion RP1 is strongly pressed by the outer protrusion 110b and the retainer protrusion 140. Thus, rainwater or the like flowing down to the vehicle upper side of the lip portion RP1 is repelled by the lip portion RP1 and accumulates in the recess DP1 on the vehicle upper side of the lip portion RP1. Then, the rainwater or the like flows down to the vehicle front side due to an inclination toward the vehicle lower side from the vehicle rear side toward the vehicle front side, and is discharged to the outside of the vehicle.

In addition, when a gap is generated in the lip portion RP1 due to vibration or the like during traveling of the vehicle V and rainwater or the like enters the vehicle lower side of the retainer protrusion 140, the rainwater or the like flows into the recess DP2 on the outside in the vehicle width direction of the lip portion RP2. A pressing force is applied to the lip portion RP2 in the direction indicated by the arrow AR3 by the hard member HR disposed on the vehicle upper side of the lip portion RP2, and the lip portion RP2 is strongly in close contact with a bottom surface portion of the sash retainer 130. Thus, rainwater or the like accumulated in the recess DP2 is repelled by the lip portion RP2. The rainwater or the like repelled by the lip portion RP2 flows down to the vehicle front side due to the inclination toward the vehicle lower side from the vehicle rear side toward the vehicle front side, and is discharged to the outside of the vehicle.

(Assembly Work)

Figure 5A:
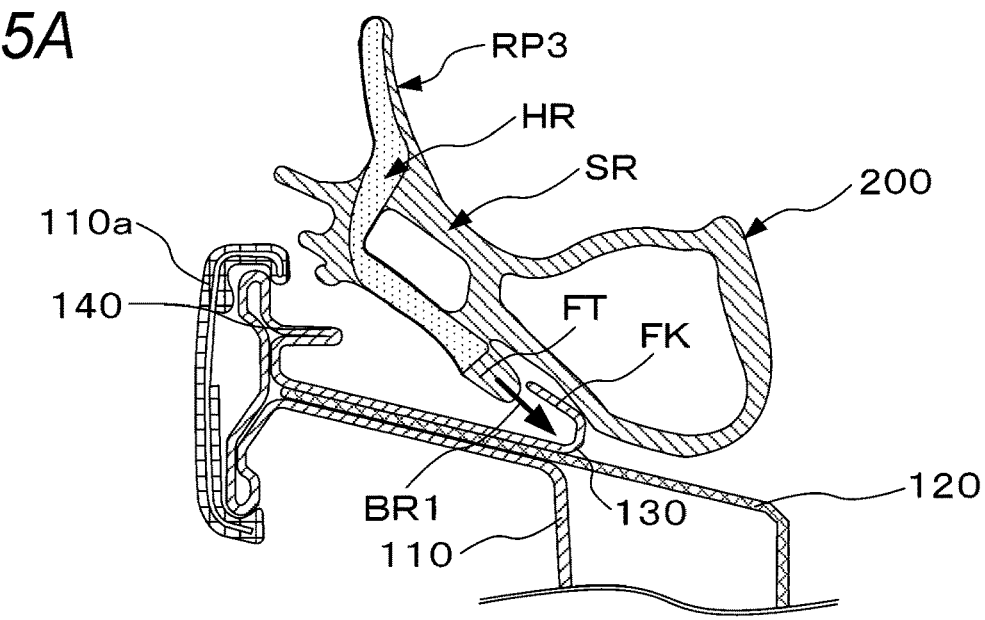

When the weather strip part 200 is assembled to the sash retainer 130, as illustrated in FIG. 5A, the worker inserts the fitting lip portion FT of the base BM of the weather strip part 200 into the folded portion FK on the inside in the vehicle width direction of the sash retainer 130 in a direction indicated by an arrow BR1. Since the hard member HR is disposed at the inner end in the vehicle width direction of the base BM, the weather strip part 200 is inserted until the hard member HR abuts on the folded portion FK on the inside in the vehicle width direction of the sash retainer 130.

Figure 5B:
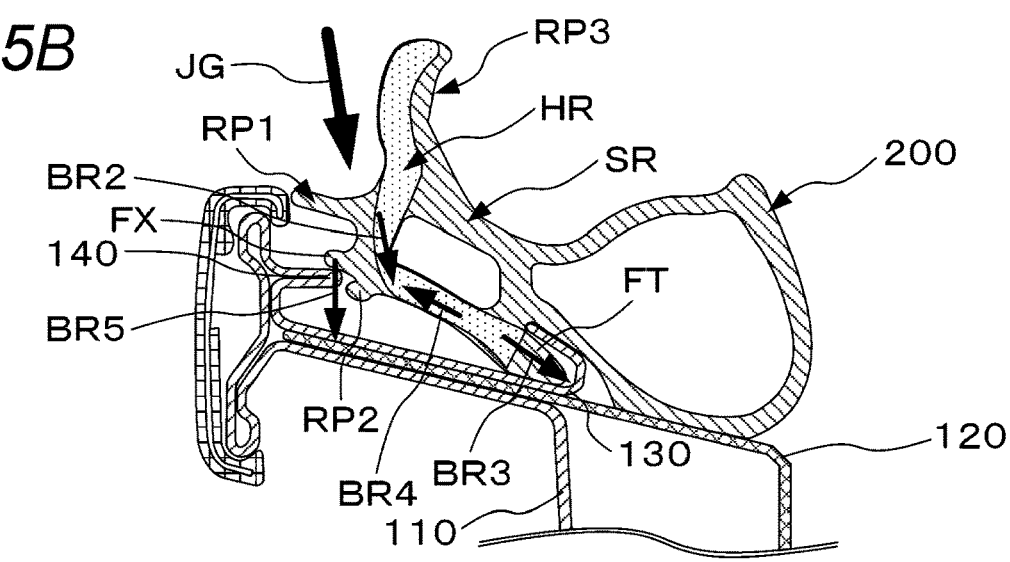

Next, as illustrated in FIG. 5B, the worker pushes the lip portion RP2 into the retainer protrusion 140, and places the fixing portion FX on the vehicle upper side of the retainer protrusion 140. Then, the worker pushes the weather strip part 200 in a direction indicated by an arrow JG from the vehicle upper side of the lip portion RP3 using an insertion jig. Since the hard member HR is disposed on the inside in the vehicle width direction of the lip portion RP1 against which the insertion jig is pressed, the pressing force applied from the direction indicated by the arrow JG is transmitted to the hard member HR, and the pressing force is applied in a direction indicated by an arrow BR2. At this time, the pressing force is transmitted to the worker as an insertion feeling through the insertion jig being used. At this time, the bent portion BP of the hard member HR is disposed on the inside in the vehicle width direction of the lip portion RP1 of the weather strip part 200. Further, the hard member HR has a linear shape from the lip portion RP1 to the bent portion BP, and a linear shape from the bent portion BP to the fitting lip portion FT in the base BM. Thus, the pressing force transmitted in the direction indicated by the arrow BR2 is efficiently transmitted in a direction indicated by an arrow BR3 via the bent portion BP, and the fitting lip portion FT is firmly fitted to the folded portion FK of the sash retainer 130.

When the fitting lip portion FT is fixed to the sash retainer 130, the pressing force transmitted to the hard member HR generates a repulsive force in a direction indicated by an arrow BR4. At this time, the repulsive force is transmitted to the worker as an insertion feeling through the insertion jig being used.

Next, the worker further pushes the weather strip part 200 in the direction indicated by the arrow JG so that the fixing portion FX of the weather strip part 200 enters the vehicle lower side of the retainer protrusion 140. Since the hard member HR is disposed on the inside in the vehicle width direction of the fixing portion FX, the fixing portion FX is pushed down in the direction indicated by an arrow BR5 by the pressing force applied from the direction indicated by the arrow BR2. Then, when the fixing portion FX gets over the retainer protrusion 140, the lip portion RP2 comes into close contact with a vehicle upper surface of the sash retainer 130 and the lip portion RP1 comes into close contact with a vehicle upper surface of the retainer protrusion 140. At this time, the pressing force applied in the direction indicated by the arrow JG changes, and the repulsive force generated in the direction indicated by the arrow BR4 changes, so that the insertion feel propagated to the insertion jig changes.

Figure 5C:
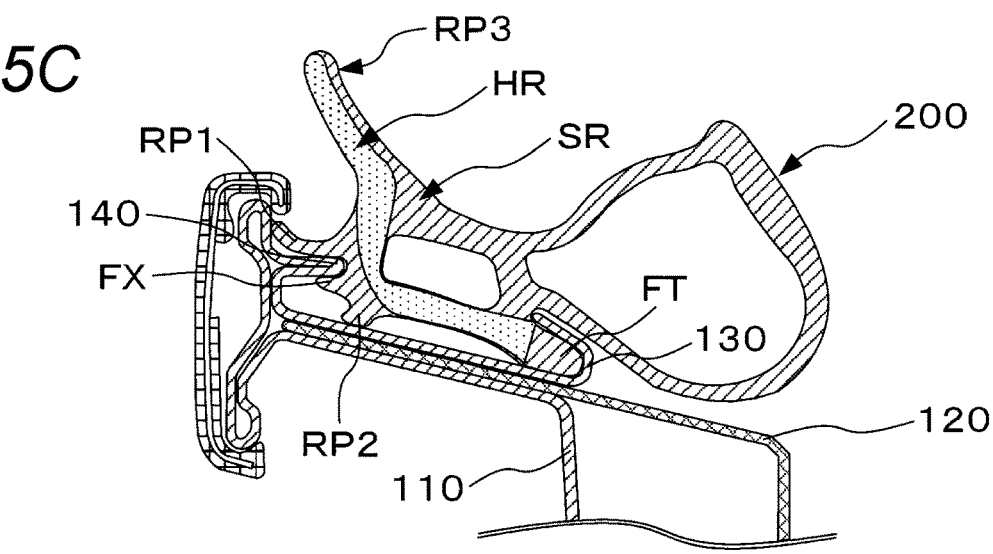

Then, as the insertion feeling propagated to the insertion jig changes, the worker recognizes that the weather strip part 200 is correctly fixed to the sash retainer 130 as illustrated in FIG. 5C, and ends the insertion work.

As described above, in the vehicle door 1 according to the present embodiment, the hard member HR and the soft member SR are integrally molded, and the weather strip part 200 that extends to surround the periphery of the vehicle door 1 on the inside in the vehicle width direction and seal between the vehicle body S and the vehicle door 1, the weather strip part including the base BM fitted to both sides in the vehicle width direction of the sash retainer 130 as a fitting portion provided in the vehicle door 1, the lip portion RP1 as a first seal portion that is in close contact with the retainer protrusion 140 provided in the sash retainer 130 from the vehicle upper side, and the lip portion RP2 as a second seal portion that is provided to protrude toward the vehicle lower side of the base BM and is in close contact with the bottom surface on the vehicle lower side of the sash retainer 130 from the vehicle upper side, a lip portion RP3 as a third seal portion that is formed to protrude toward the vehicle upper side and is in close contact with the vehicle body S from the vehicle lower side, and a fixing portion FX that is formed between the lip portion RP1 and the lip portion RP2 to protrude outward in the vehicle width direction, is in close contact with the retainer protrusion 140 from the vehicle lower side, and sandwiches and fixes the retainer protrusion 140 between the lip portion RP1 and the fixing portion FX, and the hard member HR is continuously provided to pass the vehicle upper side of the lip portion RP2 from the inner end in the vehicle width direction at the base BM, have a bent portion BP toward a vehicle upper side from the vehicle upper side of the lip portion RP2, and further pass the lip portion RP1 and the inside in the vehicle width direction of the fixing portion FX up to the vehicle upper end of the lip portion RP3.

That is, in the weather strip part 200, the hard member HR is continuously provided, from the inner end in the vehicle width direction of the base BM, to pass the lip portion RP1 and the inside in the vehicle width direction of the fixing portion FX via the bent portion BP on the vehicle upper side of the lip portion RP2, up to the vehicle upper end of the lip portion RP3. Thus, when the vehicle door 1 is closed, a pressing force is generated in the lip portion RP3 toward the vehicle lower side. Then, the weather strip part 200 can strongly bring the lip portion RP3 into close contact with the vehicle body S. In addition, in the weather strip part 200, the pressing force is transmitted to the lip portion RP1 and the lip portion RP2 via the hard member HR, and the lip portion RP1 and the lip portion RP2 and the outer door sash member 110 can be strongly brought into close contact with each other. Therefore, even when rainwater or the like enters, the rainwater or the like is repelled by the lip portion RP1, the lip portion RP2, and the lip portion RP3.

On the other hand, in the weather strip part 200, the hard member HR is disposed with the bent portion BP on the inside in the vehicle width direction of the lip portion RP1 pushed by the worker using the insertion jig in the assembling work. Then, when the worker pushes the weather strip part 200 into the sash retainer 130 from the vehicle upper side of the lip portion RP1 using the insertion jig, the pressing force is efficiently transmitted to the fixing portion FX that fixes the weather strip part 200 to the sash retainer 130, so that the worker can easily fit the weather strip part 200 into the sash retainer 130.

In addition, since the hard member HR is continuously provided from the inner end in the vehicle width direction of the base BM, via the bent portion BP on the vehicle upper side of the lip portion RP2, to the lip portion RP1 and the inside in the vehicle width direction of the fixing portion FX, the pressing force and the repulsive force from the hard member HR are transmitted from the insertion jig to be used to the worker in the assembling work. The worker can obtain the insertion feeling by propagation of the pressing force and the repulsive force through the insertion jig. Then, when the fixing portion FX is fitted to the retainer protrusion 140, the pressing force by which the worker presses the insertion jig from the vehicle upper side of the lip portion RP1 changes, and the insertion feeling propagated to the insertion jig changes. Then, the worker can recognize that the weather strip part 200 is correctly fixed to the sash retainer 130 by the change of the insertion feeling propagated to the insertion jig.

Therefore, it is possible to maintain good assembly workability and to prevent rainwater or the like from entering from the outside.

Further, in the vehicle door 1 according to the present embodiment, the hard member HR is formed in a substantially linear shape from the lip portion RP1 to the bent portion BP, and is formed in a substantially linear shape from the bent portion BP to the fitting lip portion FT as the inner end in the vehicle width direction in the base BM.

That is, in the assembling work of the weather strip part 200, since the hard member HR is has a substantially linear shape from the lip portion RP1 to the bent portion BP, the pressing force of the worker transmitted from the lip portion RP1 is efficiently transmitted to the fitting lip portion FT via the bent portion BP. In addition, since the hard member HR has the substantially linear shape from the bent portion BP to the fitting lip portion FT in the base BM, the fitting lip portion FT can be firmly fitted to the folded portion FK of the sash retainer 130.

Then, when the fitting lip portion FT is fixed to the sash retainer 130, a repulsive force is generated in the hard member HR, and the repulsive force is transmitted to the worker as an insertion feeling. When the repulsive force is transmitted to the worker, the worker can obtain an insertion feeling. Then, the worker can recognize that the weather strip part 200 is correctly fixed to the sash retainer 130 by the insertion feeling.

Therefore, it is possible to maintain good assembly workability and to prevent rainwater or the like from entering from the outside.

Note that, as an embodiment of the disclosure, an example is described in which the weather strip part 200 is integrally molded with the hard member HR and the soft member SR, and disposed to surround the periphery of the vehicle door 1 on the inside in the vehicle width direction from the inner panel 20 to the door sash part 100. However, by dividing a section where it is disposed in the weather strip part 200, the hard member HR in the lip portion RP3 may be disposed only in a section of the sash roof portion RS close to the roof portion of the vehicle body S on the vehicle upper side, for example.

Although the embodiment of the disclosure has been described in detail with reference to the drawings, the specific configuration is not limited to the embodiment, and includes a design and the like without departing from the gist of the disclosure.

The invention claimed is:

1. A vehicle door structure for a vehicle, the vehicle door structure comprising:
a weather strip part extending to surround a periphery of a vehicle door of the vehicle on an inside in a vehicle width direction of the vehicle and seal between the vehicle door and a vehicle body of the vehicle, wherein
the weather strip part includes a first member having a first hardness and a second member integrally molded with the first member, the second member having a second hardness less than that of said first hardness,
the weather strip part comprises:
a base fitted to both sides of a fitting portion in the vehicle width direction, the fitting portion being provided in the vehicle door;
a first seal portion that is in close contact with a protrusion provided in the fitting portion from a vehicle upper side of the vehicle;
a second seal portion that is provided such that the second seal portion protrudes toward a vehicle lower side of the base, and is in close contact with a vehicle upper side surface of the fitting portion from the vehicle upper side;
a third seal portion that is provided such that the third seal portion protrudes toward the vehicle upper side, and is in close contact with the vehicle body from the vehicle lower side when the vehicle door is closed; and
a fixing portion that is provided between the first seal portion and the second seal portion to protrude outward in the vehicle width direction, is in close contact with the protrusion from the vehicle lower side, and sandwiches and fixes the protrusion between the first seal portion and the fixing portion, and
the first member continuously provided such that the first member passes a vehicle upper side of the second seal portion from an inner end in the vehicle width direction at the base, has a bent portion facing a vehicle upper side from the vehicle upper side of the second seal portion, and further passes the first seal portion and the inside in the vehicle width direction of the fixing portion up to a vehicle upper end of the third seal portion.

2. The vehicle door structure according to claim 1, wherein the first member has a linear shape from the first seal portion to the bent portion, and a linear shape from the bent portion to an inner end in the vehicle width direction of the base.

* * * * *